US008817675B2

(12) United States Patent
Strub et al.

(10) Patent No.: US 8,817,675 B2
(45) Date of Patent: Aug. 26, 2014

(54) SERVICE-CENTRIC COMMUNICATION NETWORK MONITORING

(75) Inventors: Lyle Strub, Ottawa (CA); Brian McBride, Carp (CA); Laura Mihaela Serghi, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/572,856

(22) Filed: Aug. 13, 2012

(65) Prior Publication Data

US 2012/0311146 A1 Dec. 6, 2012

Related U.S. Application Data

(62) Division of application No. 11/452,522, filed on Jun. 14, 2006, now Pat. No. 8,300,529.

(51) Int. Cl.
*H04L 5/22* (2006.01)

(52) U.S. Cl.
USPC ........... 370/299; 370/235; 370/230; 709/223; 709/217

(58) Field of Classification Search
None
See application file for complete search history.

(56) References Cited

U.S. PATENT DOCUMENTS

| 6,119,160 | A | 9/2000 | Zhang et al. | |
|---|---|---|---|---|
| 7,457,870 | B1 | 11/2008 | Lownsbrough et al. | |
| 2003/0117986 | A1 | 6/2003 | Thermond et al. | |
| 2003/0229710 | A1 | 12/2003 | Lie et al. | |
| 2004/0260602 | A1* | 12/2004 | Nakaminami et al. | 705/11 |
| 2005/0086346 | A1 | 4/2005 | Meyer | |
| 2005/0268333 | A1* | 12/2005 | Betts et al. | 726/11 |
| 2006/0023642 | A1 | 2/2006 | Roskowski et al. | |

FOREIGN PATENT DOCUMENTS

WO 01/01272 A2 1/2001

OTHER PUBLICATIONS

Kang, Hun-Jeong, et. al., "A Method on Multimedia Service Traffic Monitoring and Analysis", Department of Computer Science and Engineering, POSTECH, Korea, 2003, pp. 93-105.
Cisco Systems, Inc., "NetFlow Services and Applications", XP-002258359, White Paper, Mar. 1999, pp. 1-27.
US Non-Final Office Action for U.S. Appl. No. 11/452,522, Jan. 6, 2012, 5 pp.
US Non-Final Office Action for U.S. Appl. No. 11/452,522, Jun. 9, 2011, 10 pp.
US Final Office Action for U.S. Appl. No. 11/452,522, Jan. 24, 2011, 14 pp.
US Non-Final Office Action for U.S. Appl. No. 11/452,522, Jul. 6, 2010, 15 pp.
US Final Office Action for U.S. Appl. No. 11/452,522, Feb. 23, 2010, 11 pp.
US Non-Final Office Action for U.S. Appl. No. 11/452,522, Jul. 22, 2009, 11 pp.
European Patent Office, "extended European search report", Jun. 13, 2013, 6 pp.

* cited by examiner

*Primary Examiner* — Kibrom T Hailu
(74) *Attorney, Agent, or Firm* — Eckert Seamans Cherin & Mellott, LLC

(57) ABSTRACT

Service-centric communication network monitoring apparatus and methods are provided. Service traffic, associated with a third-party service provided by an external service provider that is controlled independently of a communication network, is identified in communication traffic that is being transferred through that communication network. The identified service traffic is monitored, for example, to compile service usage statistics, to police usage of the service, to generate billing records for usage of the service, and/or to mirror the identified service traffic. A registry in which the service is registered may interact with a monitoring system of the communication network so as to establish monitoring for the service traffic.

10 Claims, 3 Drawing Sheets

SERVICE-CENTRIC COMMUNICATION NETWORK MONITORING

CROSS-REFERENCE TO RELATED APPLICATION

This application is a divisional of U.S. patent application Ser. No. 11/452,522 filed on Jun. 14, 2006.

The entire contents of this related patent application are incorporated in their entirety herein by reference.

FIELD OF THE INVENTION

This invention relates generally to communications and, in particular, to communication network monitoring.

BACKGROUND

Services for which information is distributed through a communication network are generally referred to as network services. "Web services" are an example of network services, and represent the next generation of technology being used for automatically exchanging information between different applications over the public Internet and many private networks. Web services provide a framework for building web-based distributed applications, and can provide efficient and effective automated machine-to-machine communications.

From a technology point of view, web services are network accessible functions that can be accessed using standard Internet protocols such as HyperText Transfer Protocol (HTTP), eXtensible Markup Language (XML), Simple Object Access Protocol (SOAP), etc., over standard interfaces.

The real power of web services technology is in its simplicity. The core technology only addresses the common language and communication issues and does not directly address the onerous task of application integration. Web services can be viewed as a sophisticated machine-to-machine Remote Procedure Call (RPC) technology for interconnecting multiple heterogeneous untrusted systems. Web services take the best of many new technologies by utilizing XML technology for data conversion/transparency and Internet standards such as HTTP and Simple Mail Transfer Protocol (SMTP) for message transport.

One of the primary drivers behind the development and standardization of web services is the ability to facilitate machine-to-machine communications by providing a loose coupling between disparate applications. This has the potential to drastically increase network utilization. While increasing utilization drives demand for network bandwidth, due to web services standards providing the ability to offer secure, reliable services directly over the Internet, much of this traffic will be directed over wholesale network interfaces. This can drive down per bit revenues of network operators and make it more difficult to differentiate higher margin, network-hosted services.

Web services are rapidly becoming the common method for new application development. This creates the opportunity for new revenue-generating data services based on web services interfaces. However, web services standards explicitly decouple both signaling and data from communication network infrastructure. Therefore, although web services standards facilitate the introduction of new data services and new revenue opportunities, they also make these new services more difficult to manage than controlled socket technologies used in Internet Protocol (IP) based services such as Session Initiation Protocol (SIP) based Voice over IP (VoIP). The lack of ability to monitor these services prevents network operators from performing such service-centric tasks as policing services in order to protect network infrastructure and providing value-added service capabilities such as network troubleshooting.

The ability to monitor and control network utilization by end-to-end application connections is available in some existing service networks. For example, Session Border Controllers (SBCs) are a type of network device used to provide some monitoring capabilities for SIP-based communications at network boundaries. However, existing SBCs are protocol specific and cannot parse or otherwise process service traffic.

Web services have started to appear in hosted service environments. Web services-based Service Delivery Platforms (SDPs) are application servers that have the capability to host and orchestrate third party web services. However, SDPs cannot monitor traffic between the third party and an end user unless the SDP actually orchestrates the service. While SDPs may allow network operators to deploy their own hosted web services and to provide a registry for third party services, they do not allow monitoring and control of services in which they do not participate. Providing a service-specific proxy for each third party web service would be one possible option, but does not scale profitably with high bit rate services or with an increasing number of service offerings.

Thus, there remains a need for improved monitoring of network services such as web services for communication networks.

SUMMARY OF THE INVENTION

Some embodiments of the invention address the above issues by providing a network resident web services monitoring capability.

According to an aspect of the invention, there is provided a service traffic identification module and a traffic monitor. The service traffic identification module is operable to identify, in communication traffic being transferred through a communication network, service traffic associated with a service that is accessible through the communication network and provided by a service provider that is controlled independently of the communication network. The traffic monitor is operatively coupled to the service traffic identification module and operable to perform monitoring of the identified service traffic.

The service traffic identification module may be operable to identify service traffic based on content of received communication traffic.

If the service is a service that is registered with a services registry in the communication network, the apparatus may also include an interface operatively coupled to the service traffic identification module for receiving from the services registry information associated with the service. The information associated with the service may include control information that causes the service traffic identification module to establish a monitoring session for monitoring use of the service by a user system that accesses the service through the services registry.

The monitoring performed by the traffic monitor may include at least one of: compiling service usage statistics, policing usage of the service, generating billing records for usage of the service, and mirroring the identified service traffic.

In some embodiments, the apparatus also includes an interface operatively coupled to the traffic monitor. The traffic monitor may then be further operable to provide, through the interface, an indication of a result of the monitoring.

The apparatus may be implemented, for example, in a communication network element, which may also include a traffic routing module operatively coupled to the service traffic identification module and operable to route the identified service traffic between the service provider and a user of the service.

The service is a web service in some embodiments.

Another aspect of the invention provides a method that involves identifying, in communication traffic being transferred through a communication network, service traffic associated with a service that is accessible through the communication network and provided by a service provider that is controlled independently of the communication network, and monitoring the identified service traffic.

The operation of identifying may involve accessing content of received communication traffic, and determining whether the received communication traffic comprises service traffic based on its content.

Identifying might also or instead involve receiving, from a services registry in which the service is registered, information associated with the service, and determining whether received communication traffic comprises service traffic based on the received information.

In some embodiments, the method also involves receiving information associated with expected usage of the service by a user system, and creating a monitoring session for monitoring the usage of the service by the user system, responsive to receiving the information.

The monitoring may include at least one of: compiling service usage statistics, policing usage of the service, generating billing records for usage of the service, and mirroring the identified service traffic.

The method may also include providing an indication of a result of the monitoring.

One possible embodiment of the method is in instructions stored on a machine-readable medium.

An apparatus according to another embodiment of the invention includes a services registry for storing a record associated with a service that is accessible through a communication network, and a services portal module operatively coupled to the services registry and operable to control access to the service by a user system that is configured for communications in the communication network, and to exchange monitoring control information with a monitoring system of the communication network where a user system is allowed to access the service, the monitoring system being operable to monitor service traffic associated with usage of the service by the user system.

The monitoring control information may cause the monitoring system to monitor service traffic associated with usage of the service by the user system.

In some embodiments, the services portal module is operable to control access to the service by a user system by transmitting information associated with the service to the user system, and is further operable to transmit monitoring control information to the monitoring system after the information associated with the service is transmitted to the user system.

The services portal module may be further operable to restrict access to the service in accordance with a service access control rule.

The monitoring control information may include information associated with the service and information associated with the user system.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
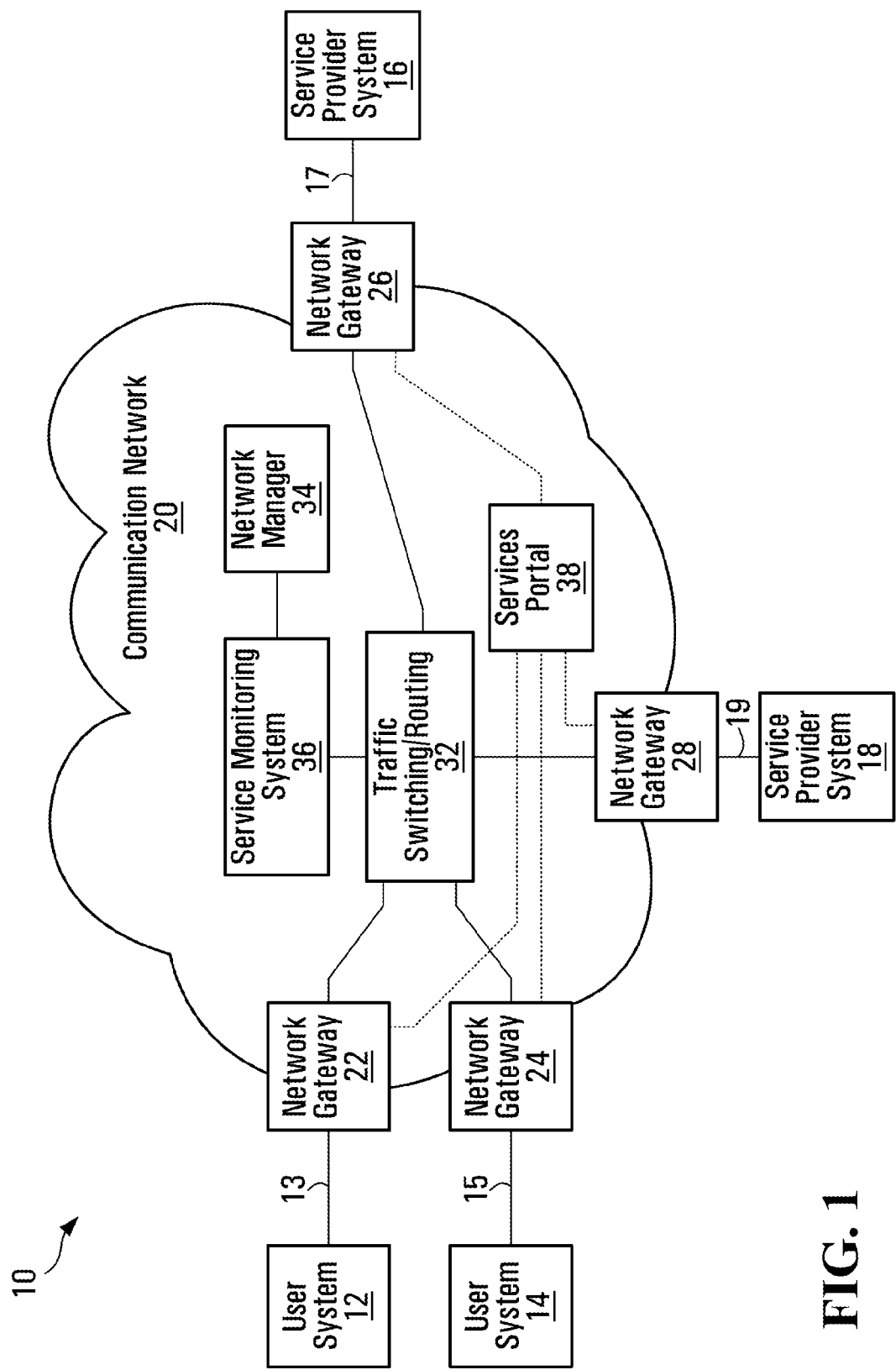
FIG. 1 is a block diagram of a communication system.

FIG. 1 is a block diagram of a communication system 10, in which embodiments of the invention may be implemented. The communication system 10 includes user systems 12, 14 and service provider systems 16, 18 that access a communication network 20 through respective communication links 13, 15, 17, 19 and network gateways 22, 24, 26, 28. The communication network 20 also includes traffic switching and/or routing components generally represented at 32, a network manager 34, a service monitoring system 36, and a services portal 38.

Although many user systems 12, 14 and service provider systems 16, 18 may be provided in a communication system, only two examples of each type of system have been shown in FIG. 1 to avoid overly complicating the drawing. A communication network could also include more or fewer network gateways than shown, many separate installations of communication equipment implementing the switching/routing components 32, and multiple service monitoring systems 36 and/or services portals 38. Explicitly showing such interconnections as those between the network manager 34 and other components of the communication network 20 would also lead to congestion in the drawing, but may exist in a communication network.

It should therefore be appreciated that the communication system 10 of FIG. 1, as well as the contents of the other drawings, are intended solely for illustrative purposes, and that the present invention is in no way limited to the particular example embodiments explicitly shown in the drawings and described herein.

The user systems 12, 14 and the service provider systems 16, 18 represent systems through which services may be used and provided, respectively. Although shown as single blocks in FIG. 1, a user system 12, 14 might be a collection of multiple user systems in an enterprise system, for example. An enterprise system might also include such components as a firewall to provide external access control and filter external traffic entering the enterprise, traffic switching and routing equipment, one or more servers for supporting network services, and user terminals, illustratively personal computers. A corporate private network is one example of an enterprise system.

A stand-alone user system is not part of a specific enterprise system, and could be mobile, as in the case of a mobile communication device, or fixed. A mobile user system may be connected to a network gateway 22, 24 through a web services mobile gateway, for example. A fixed or mobile user system 12, 14 may instead be physically connected to a network gateway 22, 24. A portable computer system, for example, is mobile in the sense that it may connect to a network gateway 22, 24 through different locations and physical connections in an access network.

The service provider systems 16, 18 may similarly be implemented as stand-alone systems or networked equipment such as enterprise systems.

Those skilled in the art will be familiar with many different types of systems that provide and/or use network services. Embodiments of the present invention relate primarily to monitoring the use of third party network services, as opposed to how these services are actually supported in the service provider systems 16, 18 or used in user systems 12, 14, and accordingly those systems and their operation are described only briefly herein to the extent necessary to illustrate aspects of the invention.

The connections 13, 15, 17, 19 may be direct connections as shown in FIG. 1, or indirect connections that traverse intermediate components and possibly other communication networks. The present invention is not restricted to network connections, or any other particular type of connection, between the network gateways 22, 24, 26, 28 and a user system or service provider system 12, 14, 16, 18. The connections 13, 15, 17, 19 may thus include any of direct, indirect, wired, and wireless connections.

Access to the communication network 20 is provided for the user systems 12, 14 and the service provider systems 16, 18 by the network gateways 22, 24, 26, 28. The network gateways 22, 24, 26, 28 are edge devices into the communication network 20 infrastructure. Each network gateway 22, 24, 26, 28 may in essence be a secure network service proxy appliance for implementing a web service gateway function, supporting proxies for network services and XML "standards", for example, as well as new features. According to one embodiment, the network gateways 22, 24, 26, 28 are high-performance devices implemented at least in part using hardware, and are configured for operation with embedded software for deployment by a communication network operator. Illustrative examples of such gateways are disclosed in U.S. patent application Ser. No. 11/105,732 entitled "NETWORK SERVICES INFRASTRUCTURE SYSTEMS AND METHODS", Ser. No. 11/105,601 entitled "PUBLIC AND PRIVATE NETWORK SERVICE MANAGEMENT SYSTEMS AND METHODS", and Ser. No. 11/105,821 entitled "SYSTEMS AND METHODS FOR MANAGING NETWORK SERVICES BETWEEN PRIVATE NETWORKS", all filed on Apr. 14, 2005, each of which is incorporated in its entirety herein by reference.

A network gateway 22, 24 that provides access to the communication network 20 for a user system 12, 14 may be substantially similar, or identical, to a network gateway 26, 28 that provides access to the communication 20 for a service provider system 16, 18. The same network equipment may thus operate in conjunction with user systems, service provider systems, or in some implementations both user and provider systems, where an enterprise system includes both user systems and service provider systems for instance.

It will be apparent from the foregoing that at least two types of entities may be involved in the system 10. Third party services are provided by the service provider systems 16, 18, which are external to the communication network 20. The communication network 20 is often provided and managed by another service provider, commonly referred to as a network operator. A service provider thus offers network services, and a network operator provides to a service provider a communication service through which one or more network services offered by the service provider are available for use by user systems. The monitoring issues noted above primarily arise where the service provider systems 16, 18 are external to the communication network 20 and are outside the management realm of the network manager 34. These service provider systems are thus controlled independently of the communication network 20.

Through the network manager 34, illustratively a Network Management System (NMS), network operator personnel can perform any of various communication network management functions. Configuration of the network gateways 22, 24, 26, 28 and the traffic switching/routing components 32, monitoring the states of the components, establishing communication paths through the communication network 20, and troubleshooting problems in the communication network are examples of functions that are enabled through the network manager 34. Those skilled in the art will be familiar with NMSs and other systems that are typically used for this purpose, and the manner in which the above and/or other functions may be performed by such systems.

Communication traffic traverses the communication network 20 through the network gateways 22, 24, 26, 28 and the traffic switching/routing components 32. Whereas control/management traffic is handled by the network manager 34, data traffic is processed by the network gateways 22, 24, 26, 28 and from there, by the switching/routing components 32.

In one embodiment, the network gateways 22, 24, 26, 28 implement a virtual extranet architecture. The above-referenced United States patent applications disclose examples of different types of virtual extranet gateways. A virtual extranet may be an application overlay network built over a network infrastructure, as a sort of private-managed services network that uses, for example, Internet technology and underlying Layer 1, 2, 3, and 4 technologies to securely share part of a service provider's information or operations with multiple user systems. An overlay network in this case represents a virtual network fabric that may be implemented using Layer 1 or 2 forwarding, IP routing, and/or application level routing, illustrated by XML router devices.

Those skilled in the art to which the present invention pertains will be familiar with many different types of communication networks, including overlay networks such as application layer networks and more traditional infrastructures. The present invention is not limited to any particular type of communication network.

The service monitoring system 36, an illustrative example of which is described in further detail below with reference to FIG. 2, may be implemented within a network element such as a router or switch, or in a separate component. In a router-based implementation, the service monitoring system 36 may be located directly in the routing path for service traffic between the user systems 12, 14 and the service provider systems 16, 18 by ensuring that the router is listed as a "next hop" at some point along each switched path established between the network gateways 22, 24 and the network gateways 26, 28.

An example of a services portal 38 is also described below, with reference to FIG. 3. The services portal 38 may be substantially similar in structure and operation to a conventional services portal, allowing the user systems 12, 14 to discover and use services that are provided by the service provider systems 16, 18 and registered in a service registry maintained by the services portal. In some embodiments, the services portal 38 also performs additional functions that are not typically supported by services portals, registries, or analogous components.

In operation, the communication network 20 enables services provided by either one of the service provider systems 16, 18 to be accessible to the user systems 12, 14. Existing standards and specifications may be used for this purpose.

For example, SOAP is one standard protocol that may be used to transport web services messages between a web client and a web server application. SOAP also provides for transfer of additional information relating to routing and security mechanisms being used. Web Services Description Language (WSDL) is an XML-based language that provides a description of web services messages, and represents an example of a standardized approach to network service description. These web services protocols (SOAP and WSDL) provide the capabilities and messaging facilities to bind and execute functionality anywhere, on any platform, without the need for custom code.

One well known service discovery mechanism is Universal Description, Discovery, and Integration (UDDI). UDDI enables user systems and applications to quickly find web services over the Internet and allows operational registries to be maintained. A UDDI registry, maintained by the services portal 38 for instance, may list services that are available from different service providers 16, 18, and contain such information as service descriptions, service provider descriptions, locations, service access lists, and/or security levels, etc.

The network gateways 22, 24, 26, 28 are service delivery points for the user systems 12, 14 and service "availability" points for the service provider systems 16, 18. The gateways may also provide secure access to the communication network 20, protecting both the service provider systems 16, 18 and the user systems 12, 14.

Communications between the network gateways 22, 24, 26, 28 through the communication network 20 are secure in some embodiments. Standards-based security techniques such as WS-Security, XML-Encryption, and XML-Signature may be used to provide secure communications while leveraging existent ingress and egress certificates that might already have been established for the user systems 12, 14 and possibly the service provider systems 16, 18. These standards-based techniques, as well as other techniques that will be apparent to those skilled in the art, ensure that authorized service consumers using the user systems 12, 14 can use services offered by the service provider systems 16, 18 through the communication network 20.

The network gateways 22, 24, 26, 28 may also perform such functions as classifying and splitting incoming communication traffic into control traffic to be forwarded to the network manager 34 and data traffic to be forwarded towards a destination through the switching/routing components 32, and/or authenticating users attempting to access the communication network 20, for example.

In general, a potential consumer of a network service, such as a web service application, can only make use of a network service which is known to exist. It is thus desirable for the service providers 16, 18 to communicate the existence of their service(s) to potential consumers, represented in FIG. 1 by the user systems 12, 14. This may be accomplished by publishing network services to registries, for instance, as briefly described above. In the system 10, the network gateways 26, 28 allow the service provider systems 16, 18 to publish their respective services to a registry in the services portal 38. The network gateways 22, 24 also allow the user systems 12, 14 to use those services.

The extent to which the services provided by the service provider systems 16, 18 are made available to the user systems 12, 14 may be controlled by the network gateways 22, 24, the services portal 38, and/or by the network gateways 26, 28. Each service provider 16, 18, or possibly a network operator through the network manager 34, may establish access control rules or other restrictions on the use of any services available through the communication network 20. These rules or restrictions may be transferred to one or more of the gateways 22, 24, 26, 28 and/or to the services portal 38 for enforcement.

As described in further detail below, the service monitoring system 36 may also play a role in policing service usage to ensure that usage of a service and the resultant communication traffic is in accordance with such rules or restrictions. Service rules or restrictions may therefore also be transferred to the service monitoring system 36. It should be noted that the service monitoring system 36 need not necessarily itself enforce service rules or restrictions, and may instead report monitoring results to enforcement systems provided at one or more of the network gateways 22, 24, 26, 28, the network manager 34, or the services portal 38, for example.

The service provider systems 16, 18 may thus publish their services to the services portal 38 for use by the user systems 12, 14. In one possible implementation, the communication network 20 is a secure private network, each user system 12, 14 and service provider system 16, 18 is located in a respective secure private network, and communications on the connections 13, 15, 17, 19 are also secure. This may be accomplished using secure tunnelling techniques, examples of which will be readily apparent to those skilled in the art. Secure communications at both access and network sides of the network gateways 22, 24, 26, 28 provide a level of assurance that private network services available through the communication network 20 are provided only by service providers that are authorized to use the communication network 20 and can only be consumed by user systems that are also authorized to use the communication network.

Operation of the service monitoring system 36 and the services portal 38 in accordance with embodiments of the invention will now be described in detail below with reference to FIGS. 2 and 3.

Figure 2:
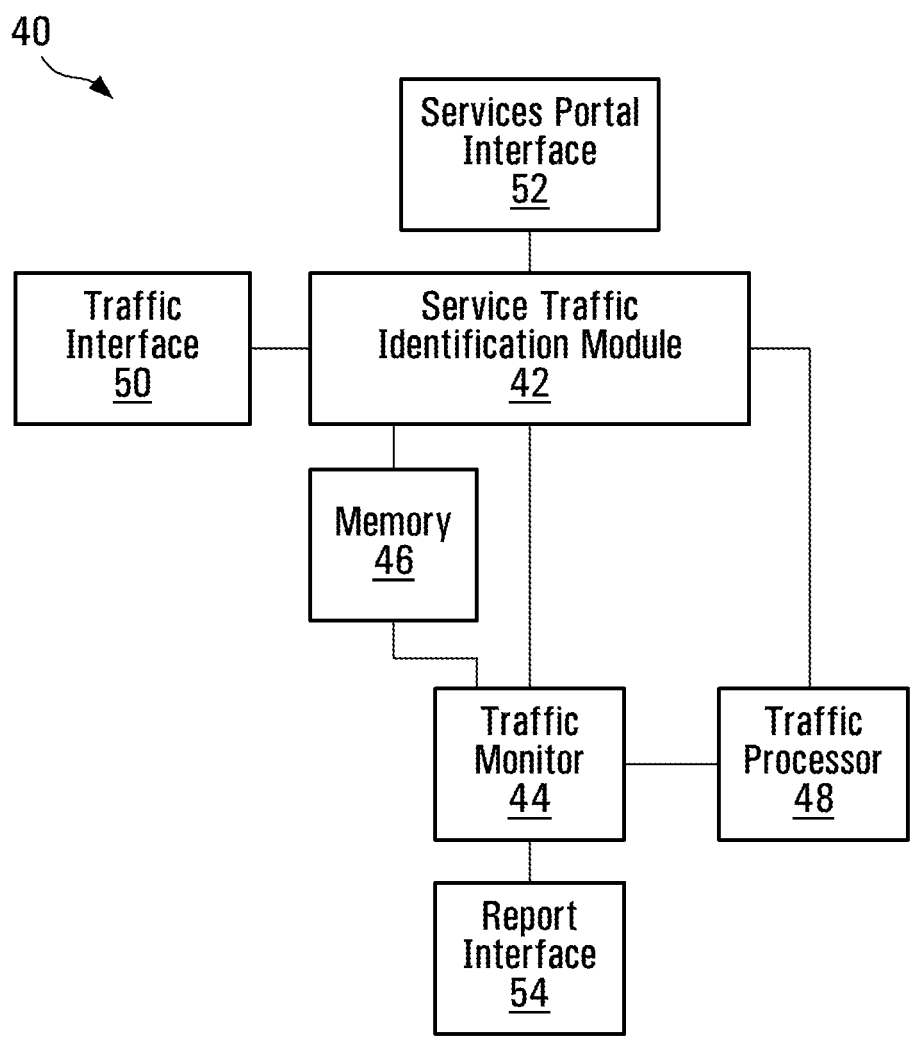
FIG. 2 is a block diagram of a service monitoring system.

Considering first the service monitoring system 36, FIG. 2 is a block diagram of an example of such a system. The system 40 includes a service traffic identification module 42 operatively coupled to a traffic interface 50, a services portal interface 52, a memory 46, and a traffic processor 48, a traffic monitor 44 operatively coupled to the service traffic identification module and to the traffic processor, and a report interface 54 operatively coupled to the traffic monitor.

The system 40 represents one possible implementation of an embodiment of the invention. Other embodiments having fewer, further, or different components with similar or different interconnections are also contemplated. The invention is in no way limited to the specific example shown in FIG. 2. For example, communication equipment in which embodiments of the invention might be implemented may include other components than those explicitly shown. Where the system 40 is implemented in a service card for a router for instance, the router may also include a traffic routing module operatively coupled to the service traffic identification module 42 and operable to route service traffic between a service provider and a user of the service. Such a traffic routing module might also route other types of traffic in a network.

The types of connections through which the components of FIG. 2 are operatively coupled may, to at least some extent, be implementation-dependent. Electronic devices often use various types of physical connectors and wired connections. In the case of cooperating software functions, for example, an operative coupling may be through variables, registers, or commonly accessed areas of the memory 46, and thus include a logical coupling.

Hardware, software, firmware, or combinations thereof may be used to implement components of the system 40. Processing elements such as microprocessors, microcontrollers, Programmable Logic Devices (PLDs), Field Programmable Gate Arrays (FPGAs), Application Specific Integrated Circuits (ASICs), and other types of "intelligent" integrated circuits may be suitable for this purpose. In one hardware-assisted software embodiment of the invention, at least the service traffic identification module 42 and the traffic monitor 44 are implemented in software for execution by a processing element, and the traffic processor 48 is an XML parsing chip that assists service monitoring functions by parsing received traffic.

The service traffic identification module 42 and the traffic monitor 44 facilitate transparent monitoring of third party services within a managed, carrier-style network, as described in further detail below. These components can effectively provide a tie between web services signaling and service fulfillment, for example, without requiring the service to be directly orchestrated in the network.

The memory 46 may include one or more memory devices for storing such information as service provider network gateway addresses, communication path identifiers, service descriptions, service rules/restrictions, etc., for use by the service traffic identification module 42 in identifying service traffic. Other information may also or instead be stored in the memory 46. Monitoring results such as billing information and/or indications of whether service traffic exceeds allowed rates, for example, could be stored in the memory 46 for later access by or transfer to another system. In a software-based embodiment, software implementing the functions of any or all of the other components of the system 40 may also be stored in the memory 46, in the same memory device used to store service and/or monitoring information or in a different memory device.

Solid state memory devices are common in electronic equipment, and the memory 46 may be implemented using one or more memory devices of this type. However, other types of memory devices, including memory devices for use with movable or even removable storage media, may also or instead be used for the memory 46.

Some embodiments of the invention may involve parsing or other processing of communication traffic to identify and/or monitor service traffic. Traffic processing may be implemented within the service traffic identification module 42 and/or the traffic monitor 44, or in a separate traffic processor 48, illustratively an XML parsing chip.

The system 40 may interact with other components of a communication network through the interfaces 50, 52, 54. These interfaces may be of the same type or different types, or even be the same interface where the same communication medium is used to transfer communication traffic and other information.

The traffic interface 50 enables the system 40 to receive communication traffic, and may be an internal interface within a switch, router, or other piece of communication equipment. In one embodiment, the interface 50 is an electronic card connector through which a service card on which the system 40 is implemented receives communication traffic from a communication medium. Other types of traffic interfaces are also possible, and may vary depending on the physical communication medium over which traffic is transferred and whether the service traffic identification module 42 is to receive traffic directly from that medium or through some other component. An optical splitter, for example, may allow the system 40 to directly "listen" to traffic on an optical fiber. Where the system 40 is integrated with a switch or router, however, the traffic interface 50 may be indirectly coupled to the communication medium through other components of the switch or router. Those skilled in the art will be familiar with many types of interfaces through which traffic may be received by the system 40.

Through the services portal interface 52, the system 40 may exchange information with a services portal with which a service to be monitored is registered. This interface, like the traffic interface 50, may be implemented in different ways depending on the communication medium and protocols through which information is to be transferred.

Results of service-centric monitoring performed by the traffic monitor 44 may be reported to other components or systems through the report interface 54. The system 40 may report monitoring results to an NMS and/or a billing system, for example, through the same, or respective, report interfaces 54.

As noted above, components of the system 40 may be implemented using hardware, software, and/or firmware. These components are therefore described herein primarily in terms of their function. Based on the functional descriptions, a person skilled in the art will be enabled to implement service monitoring techniques according to embodiments of the invention in any of various ways.

In operation, the service traffic identification module 42 identifies traffic associated with a service that is accessible through a communication network, but is provided by a service provider that is external to that communication network. References herein to a service provider being external to a network are intended to convey the notion of a third party service. Such a service may be made available through a communication network by a different entity than the network operator. Although the network itself would be managed and controlled by the network operator, a service provider system operated by another entity would be outside the management and control realm of the network operator.

Such third party services can significantly increase the amount of traffic in a network, but can be difficult for a network operator to monitor for such purposes as billing a user or the third party service provider for service-related usage of the network. It may also be advantageous for a service provider to have the network operator monitor service traffic so as to troubleshoot network problems that may affect usage of a service.

The service traffic identification module 42 may identify service traffic in any of various ways. In one embodiment, the service traffic identification module 42 passively receives communication traffic through the traffic interface 50 and determines whether that traffic is service traffic based on its content. The source or destination address of received communication traffic could be compared to addresses of known network gateways that are operatively coupled to external service providers. Communication traffic that originates with or is destined for such a network gateway might then be considered service traffic and passed to the traffic monitor 44.

Content-based service traffic identification may also or instead involve more intensive processing of received traffic. For example, received traffic could be passed to the traffic processor 48 for parsing or other processing to assess the meaning of the traffic content in the context of known services.

It is also contemplated that the system 40 could be explicitly instructed to detect traffic associated with a service. Where the service is registered with a service registry in the communication network, such as a registry maintained by the services portal 38 (FIG. 1) for instance, the service traffic identification module 42 may receive from the service registry, through the services portal interface 52, information associated with the service. This received information may be or include monitoring control information that results in the service traffic identification module 42 establishing a monitoring session for monitoring the use of the service by a particular user system that accesses the service through the service registry.

Monitoring control information may be in the form of a command, for example, which causes the service traffic identification module 42 to establish a monitoring session. According to another possible scheme, the service traffic identification module 42 is configured to set up a monitoring session when service and user information is received from a services portal. In this case, the monitoring control information need not include an explicit command to establish a monitoring session.

The particular type of service traffic identification scheme applied by the service traffic identification module 42 may be dependent upon the level of service knowledge of the system 40 and to some extent the nature of the communication network through which services are used. If the service traffic identification module 42 has access only to service delivery and/or availability point addresses, then an address-based identification scheme could be used. Knowledge of the types of traffic that would be exchanged between user and service provider systems during usage of the service might support a more involved and possibly more accurate or selective identification scheme.

Service identification information to be used in identifying service traffic may be pre-loaded in the memory 46 or subsequently received by the service traffic identification module 42. This information may be provided to the system 40 by a services portal or other registry system, by a service provider system, or by a network operator through an NMS, for example. Configurable or otherwise adaptable service traffic identification criteria provide a flexible system in which different service traffic, and thus different services, can be identified and monitored at any time.

Once service traffic has been identified, or in some embodiments when monitoring control information is received from a services portal, the service traffic identification module 42 may establish a monitoring session for a corresponding service delivery session. This may involve creating a monitoring session record in the memory 46. Such a record might include at least information associated with the service and the service delivery session participants. An indication of the monitoring to be performed for that service delivery session could also be provided in a monitoring session record, where the traffic monitor 44 is capable of performing different types of monitoring information. If a monitoring session has already been created for a service delivery session, then a monitoring session record may exist in the memory 46 and a new record need not be created.

The traffic monitor 44 performs service-centric monitoring of service traffic identified by the service traffic identification module 42. Depending on the implementation of the system 40, non-service traffic may be dropped or passed through to other components by the service traffic identification module 42 or the traffic monitor 44. The service traffic identification module 42 may be located in a routing path through a communication network, for example, in which case it may forward both service and non-service traffic along the routing path and also pass service traffic to the traffic monitor 44. Another possible option would be to deploy both the service traffic identification module and the traffic monitor 44 in a routing path. All traffic then flows through these components, but the traffic monitor 44 actually monitors only service traffic. If the service traffic identification module 42 and the traffic module 44 instead passively listen to traffic as it is transferred through a network, then non-service traffic can simply be ignored.

Service monitoring information, like service traffic identification information described above, may be stored in the memory 46. Stored service monitoring information may indicate the services that are to be monitored and the types of monitoring to be performed for those services, for example. This information, and in some embodiments the traffic monitor 44 itself, may be configurable. Using an NMS for instance, a network operator could establish different types of monitoring for different services. In some embodiments, service monitoring information is stored in the memory 46 as part of a monitoring session record created by the service traffic identification module 42. The service monitoring information could be generated by the traffic identification module 42 based on service information received from a services portal, for instance.

One example of the type of monitoring that may be performed by the traffic monitor 44 is service statistics monitoring. For each service delivery session, the traffic monitor 44 may track traffic levels by maintaining byte counts, packet counts, and/or traffic rates such as peak and average bit rates.

Service policing may also or instead be performed by the traffic monitor 44. A network operator may set rate limits to be applied to any monitored service delivery session, for example. Compliance with such a rule or restriction can be at least monitored by the traffic monitor 44, and may in some embodiments also be enforced by the traffic monitor.

The traffic monitor 44 may thus perform other monitoring-related functions, including rate limit enforcement in the preceding example. Another example of a monitoring-related function that may be performed by the traffic monitor 44 is service traffic mirroring, in which copies of monitored service traffic are redirected to an NMS or other system. This function would be useful to provide troubleshooting support or potentially even lawful intercept of service traffic, for instance.

Service mirroring represents one form of reporting that may be supported by the traffic monitor 44 and the report interface 54. As noted above, copies of service traffic could be mirrored to an NMS for troubleshooting, interception, or possibly other purposes. Service statistics, billing records that could be generated by the traffic monitor 44 from the service statistics or other monitored parameters, or in general any or all monitoring results could be reported to an NMS, billing system, or other system through the report interface 54. This reporting may be done automatically when a service delivery session, and thus its corresponding monitoring session, is terminated, or responsive to a request from a system to which monitoring results are to be reported. Termination of a service delivery session could be detected by the service traffic identification module 42 or the traffic monitor 44 by processing received service traffic, for example.

The types of monitoring performed by the traffic monitor 44 may be dependent upon its level of awareness of the monitored service. As noted above, the traffic processor 48, illustratively an XML parsing chip, is capable of processing identified service traffic. Where the traffic monitor 44 is aware of format definitions or other detailed information associated with a service, the "meaning" of service traffic can be understood by the traffic monitor 44. This type of relatively intensive monitoring might be possible, for example, where the monitoring system 40 interacts with a services portal or in a services network extranet, noted above. The decoupling of signalling and data by web services typically prevents such a high level of service-centric monitoring in conventional systems.

Results of the monitoring performed by the traffic monitor 44 may also or instead be stored in the memory 46. Stored monitoring results could be maintained in the memory 46 at least until they are reported. Monitoring results may be stored until explicitly removed from the memory 46 so as to provide historical accounts of service monitoring for particular services, service delivery sessions, users, and/or service providers.

Whereas web services standards explicitly decouple the signaling and data from the network infrastructure, the system 40 can provide embedded network monitoring and management capabilities that extend network monitoring concepts generally associated with Layer 2 or Layer 3 networks into the realm of applications that use web services technology. A network operator, using the techniques disclosed herein, can monitor network usage patterns of third party services and potentially apply usage-based billing to those services. Troubleshooting of detected or reported problems in the third party service offerings can also be facilitated.

It should also be noted that monitoring by the system 40 is transparent to both users and service providers. The monitoring system 40 is not involved in orchestrating a service and does not otherwise participate in service delivery. Thus monitoring is performed without affecting interactions between service providers and users. The service providers and users interact with their network gateways, and need not even be aware that the service delivery is being monitored.

Figure 3:
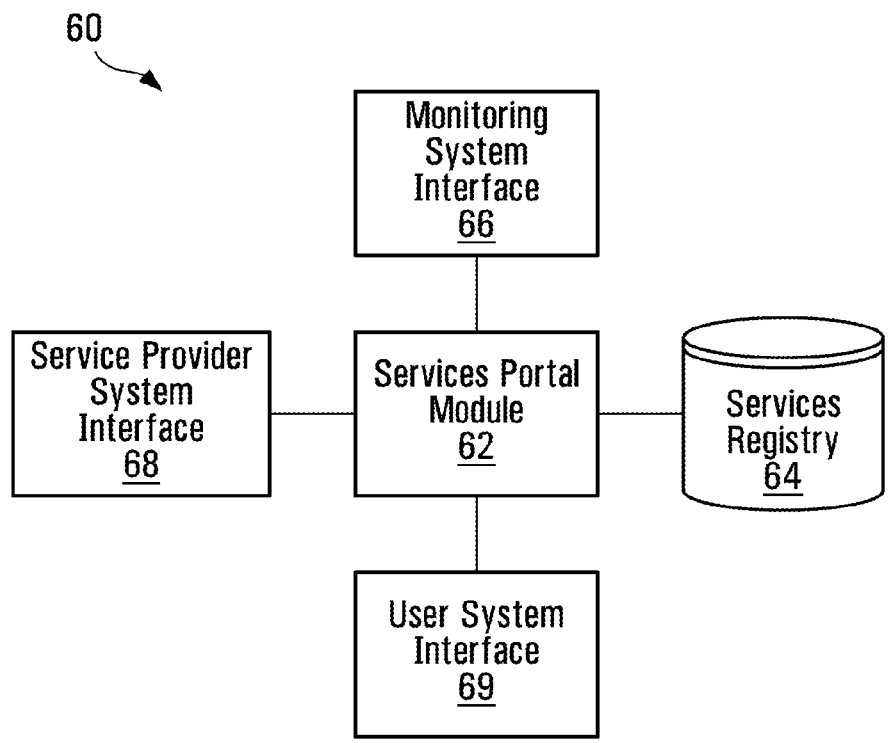
FIG. 3 is a block diagram of a services portal.

FIG. 3 is a block diagram of a services portal 60, which includes a services portal module 62 operatively coupled to a services registry 64, a monitoring system interface 66, a service provider system interface 68, and a user system interface 69.

The arrangement shown in FIG. 3 illustrates one possible implementation of a services portal according to an embodiment of the invention. Other embodiments may include fewer, further, or different components with similar or different interconnections. For example, as noted above with reference to FIG. 2, communication equipment in which embodiments of the invention might be implemented may include other components than those explicitly shown. Different divisions of functions are also contemplated, in that service registration and access functions may be supported by separate components. In the services portal 60, these functions are performed by the services portal module 62, as described in further detail below.

Like the connections shown in FIG. 2, those in FIG. 3 may be implementation-dependent, and include physical and/or logical couplings.

Components of the services portal 60 may be implemented using hardware, software, firmware, or combinations thereof. The services portal module 62 provides traditional service registry/portal functions, allowing service providers to register their services in the services registry 64 and users to subsequently discover and use those services, for example. Service information is provided to the services portal module 62 through the service provider interface 68, and communication with service consumers is enabled by the user system interface 69. In some embodiments, the same type of interfaces, or even the same interface, may be used as the service provider system and user system interfaces 68, 69. Those skilled in the art will be familiar with hardware/software/firmware arrangements that are suitable for implementing the services portal module 62 and the interfaces 68, 69.

The services registry 64 includes one or more memory devices, such as solid state memory devices, movable-media memory devices, and/or removable-media memory devices, for storing service information. This service information may include service provider network gateway addresses and/or other service provider identifiers, service descriptions, service rules/restrictions, etc., associated with services that are to be accessible through the services portal 60.

Although not explicitly shown in FIG. 3, one or more additional memory components may be provided for storing other types of information. Software that supports functions of any or all of the other components of the services portal 60 may be stored in a program memory, for example.

In accordance with an embodiment of the invention, the services portal 60 may interact with other components of a communication network, a monitoring system in the example shown in FIG. 3, through the monitoring system interface 66. This interface may be the same type as or a different type than the interfaces 68, 69, and is compatible with the services portal interface 52 (FIG. 2), described above. The monitoring system interface 66 allows the services portal 60 to exchange information with a monitoring system so as to cause the monitoring system to monitor any or all service delivery sessions for a service that is registered with the services registry 64.

Since components of the services portal 60 may be implemented using hardware, software, and/or firmware, these components are described primarily in terms of their function. A person skilled in the art will be enabled to implement embodiments of the invention in any of various ways based on the functional descriptions.

In operation, the services portal module 62 allows a user system that is configured for communications in a communication network to access a service that is registered in the services registry 64. The services portal module 62 may also perform other functions, such as restricting access to registered services in accordance with service access control rules established by a provider of the service and/or the network operator. Service access rules/restrictions may be stored with other service information in the services registry 64 or in a separate memory area or device.

The services registry 64 may include information associated with multiple services. The registered service(s) may include network-hosted services offered by a network operator. In accordance with an embodiment of the invention, the services portal module 62 also provides service registration and access functions for one or more third party services that are accessible through the communication network but provided by service providers external to the communication network.

Service registration and access functions provided by the services portal module 62 and the service registry 64 may be substantially similar to traditional service registry functions. The services portal module 62, however, also interacts with a monitoring system through the interface 66 to establish a monitoring session for a service delivery session for a registered service.

When a user system discovers a registered service, illustratively through UDDI, that user system may subsequently establish a service delivery session with a service provider system that supports the discovered service. The services portal module 62 might be involved only in the discovery stage of this process, providing service discovery information such as a service provider system network gateway address and a service description to the user system, but need not necessarily be involved in establishing the service delivery session.

In the former arrangement, the services portal module 62 may transmit monitoring control information to the monitoring system through the interface 66 after the service information is transmitted to the user system. Monitoring control information may include information associated with the service and information associated with the user system, so that the monitoring system can identify the service delivery session for which a monitoring session is to be established. When the service delivery session is established by the user system, it is monitored by the monitoring system.

Where the services portal 60 orchestrates a service or is otherwise involved in establishing a service delivery session, the service portal module 62 might instead wait until the service delivery session is established before sending monitoring control information to the monitoring system.

This type of interaction between a services portal and other components of a communication network is not supported by conventional services registries or portals.

Figure 4:
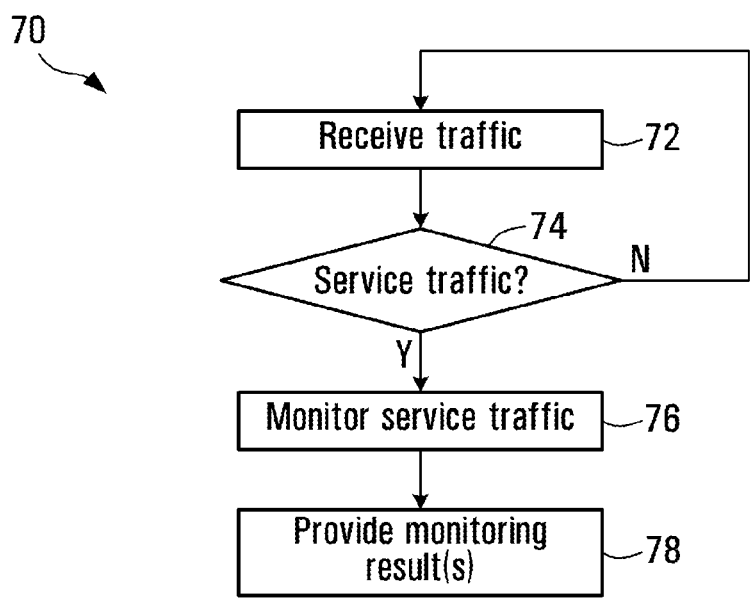
FIG. 4 is a flow diagram of a services monitoring method.

Embodiments of the invention have been described above primarily in the context of systems and apparatus. FIG. 4 is a flow diagram of a services monitoring method according to another embodiment of the invention.

The method 70 involves receiving communication traffic at 72, and at 74, identifying service traffic associated with a service that is accessible through a communication network but provided by a service provider external to the communication network. Service-centric monitoring of the identified service traffic is performed at 76. Non-service traffic may be dropped or passed to other components, but need not be otherwise handled for the purposes of service monitoring. A result of the monitoring is provided, to an NMS and/or a billing system for instance, at 78.

Other embodiments of the invention may involve performing the illustrated operations in different ways, varying the order in which the operations are performed, and/or performing fewer or additional operations.

For example, identifying service traffic at 74 may involve accessing content of the received communication traffic, and determining whether the received communication traffic is service traffic based on its content. According to another embodiment, the identifying operation involves receiving information associated with the service from a service registry in which the service is registered, and determining whether the received communication traffic is service traffic based on the received information.

Received service-related information may indicate expected usage of the service by a user system, for example. In this case, a method may involve creating a monitoring session for monitoring the usage of the service by the user system.

Examples of monitoring that may be performed at 76 include compiling service usage statistics, policing usage of the service, generating billing records for usage of the service, and/or mirroring the identified service traffic.

Further variations of the method 70 may be or become apparent to those skilled in the art, from the above system and apparatus descriptions for instance.

Service monitoring as disclosed herein may be implemented to provide a network resident capability to capture service level statistics and troubleshoot services in real time. In one possible scenario, a web services portal hosts a registry for third party web services interfaces, and end users utilize the portal to discover web services. A services monitor that is located in the execution path of the service or otherwise receives communication traffic associated with the service can provide the ability for a network provider to monitor, police, and troubleshoot the service delivery.

Such monitoring of third party services without requiring service orchestration also allows scalability in the number of monitored third party service offerings that can be made available through a communication network, in a cost effective manner.

Embodiments of the invention may also allow network operators to ensure compliance of third party applications to advertised network usage patterns, to add the potential for usage based billing, and to facilitate troubleshooting of detected or reported problems.

What has been described is merely illustrative of the application of principles of embodiments of the invention. Other arrangements and methods can be implemented by those skilled in the art without departing from the scope of the present invention.

For example, the divisions of functions shown in FIGS. 2 and 3 are illustrative of embodiments of the invention. Further, fewer, or different elements may be used to implement the techniques disclosed herein. Traffic policing, for example, may be provided by a separate module rather than included in the traffic monitor as shown in FIG. 2.

In addition, although described primarily in the context of systems, apparatus, and methods, other implementations of the invention are also contemplated, as instructions stored on a machine-readable medium for example.

We claim:

1. An apparatus comprising:
 a services registry for storing a record associated with a service, the service being accessible through a communication network; and
 a services portal module operatively coupled to the services registry and operable to: control access to the service by a user system, the services portal module being operable to control access to the service by transmitting information associated with the service to the user system, the user system being configured for communications in the communication network; and to, where a user system is allowed to access the service, exchange monitoring control information with a monitoring system of the communication network, the monitoring system being operable to monitor service traffic associated with usage of the service by the user system.

2. The apparatus of claim 1, wherein the monitoring control information causes the monitoring system to monitor service traffic associated with usage of the service by the user system.

3. The apparatus of claim 1, wherein the services portal module is further operable to transmit the monitoring control information to the monitoring system after the information associated with the service is transmitted to the user system.

4. The apparatus of claim 1, wherein the services portal module is further operable to restrict access to the service in accordance with a service access control rule.

5. The apparatus of claim 1, wherein the monitoring control information comprises information associated with the service and information associated with the user system.

6. A method comprising:
 storing, in a services registry, a record associated with a service, the service being accessible through a communication network;
 controlling, by a services portal module operatively coupled to the services registry, access to the service by a user system, the controlling comprising transmitting information associated with the service to the user system, the user system being configured for communications in the communication network; and
 where a user system is allowed to access the service, exchanging, by the services portal module, monitoring control information with a monitoring system of the communication network, the monitoring system being operable to monitor service traffic associated with usage of the service by the user system.

7. The method of claim 6, wherein the monitoring control information causes the monitoring system to monitor service traffic associated with usage of the service by the user system.

8. The method of claim 6,
the exchanging comprising transmitting the monitoring control information to the monitoring system after the information associated with the service is transmitted to the user system.

9. The method of claim 6,
the controlling comprising restricting access to the service in accordance with a service access control rule.

10. The method of claim 6, wherein the monitoring control information comprises information associated with the service and information associated with the user system.

* * * * *